United States Patent [19]

Soeda et al.

[11] 4,228,383

[45] Oct. 14, 1980

[54] SPEED CONTROL CIRCUIT ARRANGEMENT FOR AN AC COMMUTATOR MOTOR

[75] Inventors: Katsuji Soeda; Mitsuhiro Oyama; Fumio Sakuma; Tadashi Nakajima, all of Sukagawa, Japan

[73] Assignee: Yamamoto Electric Industries, Ltd., Fukushima, Japan

[21] Appl. No.: 974,116

[22] Filed: Dec. 28, 1978

[30] Foreign Application Priority Data

Dec. 28, 1977 [JP] Japan .................... 52/158773

[51] Int. Cl.³ .................... H02P 5/40; H02P 7/28
[52] U.S. Cl. .................... 318/245; 307/232
[58] Field of Search ........... 318/245, 249, 345 H, 318/345 D; 307/252 B, 252 N

[56] References Cited

U.S. PATENT DOCUMENTS

| | | | |
|---|---|---|---|
| 3,165,688 | 1/1965 | Gutzwiller | 307/252 N |
| 3,222,583 | 12/1965 | Gutzwiller | 307/252 N |
| 3,283,235 | 11/1966 | Auld et al. | 307/252 N |
| 4,002,959 | 1/1977 | Shadlich et al. | 318/245 |
| 4,039,913 | 8/1977 | Clegg | 318/245 |
| 4,069,446 | 1/1978 | Yonehara | 307/252 B X |

*Primary Examiner*—J. V. Truhe
*Assistant Examiner*—John W. Redman
*Attorney, Agent, or Firm*—Armstrong, Nikaido, Marmelstein & Kubovcik

[57] ABSTRACT

A speed control circuit arrangement for controlling a rotational speed of an AC commutator motor by an AC controlled rectifier element. The speed control circuit arrangement comprises a pulse transformer which is connected at the secondary winding to the control electrode of the AC controlled rectifier element and one of two main electrodes of the controlled rectifier element and supplies a trigger pulse to the control electrode, a variable resistor for adjusting the rotational speed of the motor, a first capacitor connected at one end through the variable resistor to the other main electrode and at the other end to one end of an AC power source, a pulse generating element connected across said first capacitor with the primary winding of the pulse transformer intervening therebetween, and a first resistor connected at one end to the one main electrode and at the other end to the other end of the AC power source through the first capacitor. With such a construction, an inductive voltage regenerated in the armature of the motor (hereinafter referred to as a flash voltage) is effectively used to perform a stable operation of the AC commutator motor at a low speed.

2 Claims, 7 Drawing Figures

DECREASE OF CONDUCTING PHASE ANGLE

INCREASE OF CONDUCTING PHASE ANGLE

SPEED CONTROL CIRCUIT ARRANGEMENT FOR AN AC COMMUTATOR MOTOR

BACKGROUND OF THE INVENTION

1. Field of the Invention

The invention relates to a speed control circuit arrangement for an AC commutator series motor and, more particularly, to an improvement over the speed control circuit arrangement in which an inductive voltage (hereinafter referred to as a flash voltage) regenerated in the armature of the motor is positively fed back to an electric charge storing capacitor through a resistor, that is, with such a polarity that it may increase a control voltage and the speed control characteristic at a low speed running of the motor may be improved.

2. Description of Prior Art

FIG. 1 shows a circuit diagram of a conventional speed control circuit arrangement. In the FIGURE, reference numeral 1 designates a power source switch; 2 a Triac; 3 a Diac for supplying a trigger signal to the gate etectrode of the Triac; 4 an electric charge storing capacitor for causing the Diac 3 to produce the trigger pulse; 5 a protective resistor for preventing an overcurrent from flowing into the Diac 3; 6 a variable resistor for adjusting the rotational speed of the motor from the minimum to the maximum speed; 7 an AC commutator motor. In operation, the power switch 1 is first turned on. Upon the turning on, a positive half cycle of voltage, for example, is supplied from the AC power source AC to the power source switch side. At this time, voltage is applied across the charge storing capacitor 4 through the protective resistor 5 and the variable resistor 6. As a result, the capacitor 4 is charged at a time constant determined by the resistances of the resistors 5 and 6 and the capacitance of the capacitor 4. When the variable resistor 6 is set at the maximum resistance value, the voltage at the terminal of the capacitor 4 connecting to the Diac 3 does not reach the breakover voltage of the Diac 3, so that the Diac does not conduct and no trigger signal is applied to the gate electrode of the Triac 2. Therefore, the Triac is not turned on and thus the motor does not operate. Then, the resistance of the variable resistor 6 is gradually decreased by adjusting the variable resistor 6. With decreasing of the resistance, the charging voltage increases to reach the breakover voltage of the Diac 3. At this time, the AC power source A.C. applies a positive half cycle of voltage across the motor 7, with the result that an exciting current flows into a field coil and an armature A starts rotating. At that time, however, the time constant is large so that the conducting phase angle of the Triac is retarded by relatively large amount with respect to the phase of the power source voltage. Accordingly, the motor initiates to rotate from low speed. As the resistance of the variable resistor 6 is decreased, the rotational speed of the motor increases and when the resistance is adjusted for the minimum value, the rotational speed reaches the maximum.

However, since the speed control circuit arrangement has the following defect, practically it has not been used but the DC speed control circuit arrangement has been used instead. The waveforms shown in FIGS. 4A and 4B are those of voltages appearing between terminals A and B of the motor shown in FIG. 1. FIG. 4A is the voltage waveform when the motor is connected to a light load and FIG. 4B a voltage waveform when the motor is connected to a heavy load. As seen from those waveforms, the conducting phase angle changes depending on the load. More specifically, the conducting phase angle with respect to the heavy load is more retarded than that with respect to the light load. Accordingly, with increase of load, the rotational speed of the motor decreases and electric power injected into the motor also decreases. This further decreases the rotational speed. Thus, the operation of the motor at low speed becomes very unstable. The reason to cause such a phenomena will be described in brief below. The shaded portions in the waveforms of FIGS. 4A and 4B indicate the flash voltages induced in the armature of the motor when the drive current to the motor is shut off by the Triac 3. The flash voltage depends largely on the rotational speed of the motor. As the rotational speed increases, the flash voltage decreases. On the other hand, as the rotational speed decreases, the flash voltage increases. In this way, the flash voltage changes in accordance with the rotational speed. This is seen from comparison of the respective waveforms between the respective light and heavy loads, as illustrated in FIGS. 4A and 4B. As shown, the flash voltage is small at the light load (the motor speed is high) while it is large at the heavy load (the motor speed is low). It is considered that the flash voltage causes the above-mentioned problem. Namely, the flash voltage is opposite in polarity to the voltage of the preceding half cycle and is the same in polarity as the voltage of the succeeding half cycle. However, the inductive current flowing through the capacitor 4 due to the flash voltage is opposite in polarity to the current caused by the succeeding half cycle voltage. This will be further eleborated referring again to the circuit diagram shown in FIG. 1. The flash voltage appears between the terminals A and B of the armature A of the motor 7. Assume now that the preceding half cycle voltage is positive and causes a current to flow from the terminal A to B. In this case, the terminal A is positive and the B is negative. When the positive half cycle voltage becomes zero and the drive current is shut off, a flash voltage appears with a polarity that A is negative and B is positive. The current caused by the flash voltage will flow from A to B. In the succeeding negative half cycle, the power source boltage starts increasing from zero with a polarity that B is positive and A is negative. The power source voltage causes a current to flow through a path of the terminals B, A, the capacitor 4, the variable resistor 6, the resistor 5 to power switch 1. Accordingly, the capacitor is charged by a potential difference beween the power source voltage and the flash voltage. For example, when the load of the motor increases and the rotational speed decreases, the flash voltage increases. Accordingly, the arrival of the voltage across the capacitor at the breakover voltage will be delayed so that the conducting phase angle will decrease and therefore the drive current flowing into the motor 7 will decrease. As a result, the motor speed will further decrease. On the other hand, when the load decreases, the motor speed increases and therefore the flash voltage also decreases. Hence, the conducting phase angle advances to increase the current flowing through the motor 7 and the motor speed. Through this vicious cycle, the motor speed rapidly increases. As described above, when the conventional motor speed control circuit arrangement is used, it is impossible to secure a stable operation of motor at low speed.

SUMMARY OF THE INVENTION

Accordingly, an object of the invention is to provide a speed control circuit arrangement for an AC commutator motor improved in that the motor can operate stably even at low motor speed by effectively using the flash voltage.

According to the present invention, there is provided a speed control circuit arrangment for an AC commutator motor comprising: an AC main control element having a control electrode, first and second main electrodes, and connected at the first main electrode to one end of an external AC power source through a power switch, and connected at the second main electrode to the other end of said external AC power source through an AC commutator motor, for controlling a drive current flowing into the motor; a pulse transformer connected at the secondary winding between the control electrode and the second main electrode, for supplying a trigger signal to the control electode; a variable resistor for adjusting the rotational speed of the motor; a first capacitor connected between the first main electrode and the other end of the AC power source, with the variable resistor intervening between the first capacitor and the first main electrode; a pulse generating element connected across the first capacitor, with the primary winding of the pulse transformer intervening therebetween; and a first resistor connected at one end to the second main electrode and at the other end to the other end of the power source through the first capacitor.

DESCRIPTION OF THE PREFERRED EMBODIMENT

Figure 2:
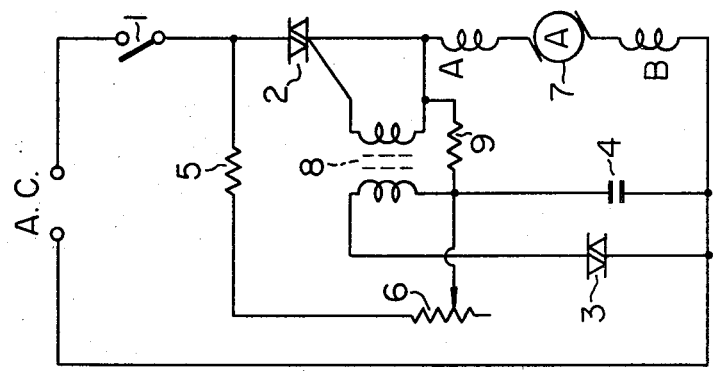
FIG. 2 shows a basic circuit of a speed control circuit arrangement for an AC commutator motor according to the invention.
Figure 1:
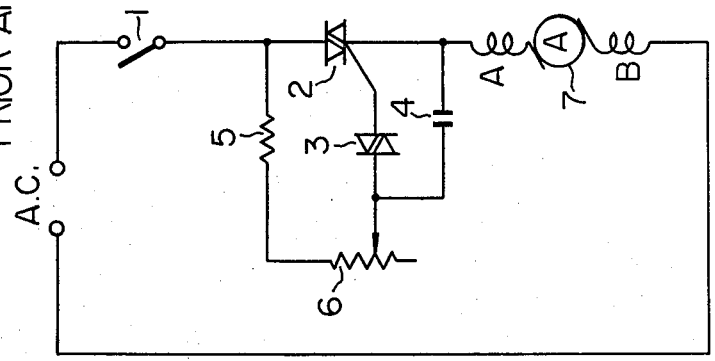
FIG. 1 is a circuit diagram of a conventional speed control circuit arrangement for an AC commutator motor.
Figure 4A:
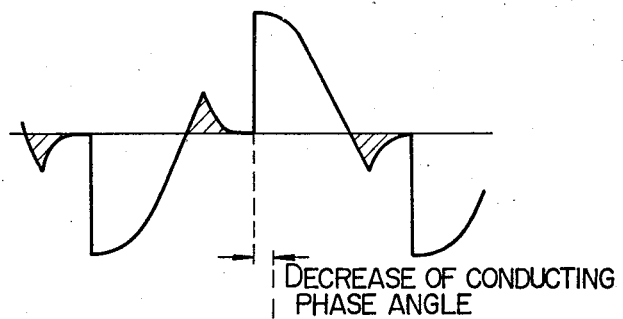
FIGS. 4A, 4B, 5A and 5B show waveforms of voltages appearing between both the terminals of the motor when the motor is connected to a light load and a heavy load in FIGS. 1 and 2, respectively.
Figure 4B:
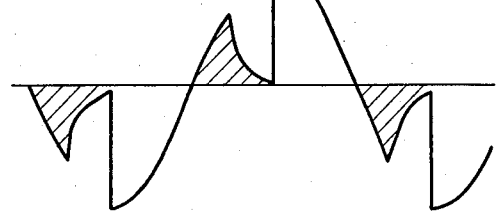

Reference is first made to FIG. 2 illustrating a basic circuit of a speed control circuit arrangement for an AC commutator motor according to the invention. In the figure, reference numeral 1 designates a pwer switch; 2 a Triac as an AC control element; 3 a Diac as a pulse generating element for supplying a trigger signal to the gate of the Trias; 4 an electric charge storing capacitor for causing the Diac 3 to produce a trigger pulse; 5 a protective resistor for preventing an overcurrent from flowing into the Diac 3; 6 a variable resistor for adjusting the rotational speed of the motor from the minimum speed to the maximum speed; 7 an AC commutator motor; 8 a pulse transformer for supplying a trigger signal generated by the conduction of the Diac 3 to the gate electrode of the Triac; 9 a feedback resistor for feeding a flash voltage appearing between both terminals A and B of the motor back to the capacitor 4.

In operation, the power switch 1 is first closed, so that a current flows through a current path including power switch 1, resistor 5, variable 6, capacitor 4, resistor 9 and motor 7. At that time, if the resistance of the variable resistor 6 is set at the maximum value, the voltage across the capacitor 9 fails to reach the breakover voltage, so that charges stored in the capacitor 9 is not discharged. Accordingly, no trigger signal is applied to the Triac 2 and thus the motor sustains its stop condition. Then, as the resistance of the variable resistor is gradually decreased, a current gradually increases, the charge voltage across the capacitor 4 reaches the breakover voltage, the Diac will be brought into a conducting state and charge in the capacitor 4 is abruptly discharged through the primary winding of the pulse transformer. Accordingly, a gate signal is supplied from the secondary winding of the pulse transformer 8 to the gate electrode of the Triac 2. Upon receiving the gate signal, the Triac 2 will be brought into a conducting state. However, the conducting phase angle of the Triac 2 at that time is delayed, so that the conducting phase angle is small and the motor 7 starts operating with low speed. As the resistance of the variable resistor 6 is further decreased, the rotational speed increases, and when the resistance is adjusted for the minimum value, the rotations speed of the motor will be at maximum. The feedback operation through the resistor 9 will be described below. The flash voltage appearing between both the terminals A and B of the motor is exactly the same as that mentioned above. The flash voltage directly charges the capacitor 4 through the resistor 9. In that case, the charging by the power source voltage is conducted through a path including the power source switch 1, resistor 5 and variable resistor 6, as mentioned above. With respect to the charged voltage across the capacitor 4 by the power source voltage and the flash voltage in that case, if the conducting current flows from the terminal A to the terminal B in the preceding positive half cycle, the power source voltage at that time has a polarity that the terminal A is positive and the terminal B is negative, and therefore, the flash voltage has a polarity that the terminal B is positive and the terminal A is negative. In the suceeding negative half cycle of the voltage, the terminal B is positive and terminal A is negative. Accordingly, in that case, the capacitor 4 is charged by the sum of the power source voltage and the flash voltage, and is abruptly charged, with the result that the voltage across the capacitor 4 rapidly reaches the breakover voltage of the Diac 3 and then the Diac 3 is brought into a conducting state thereby to supply a trigger signal to the Triac 2. Thus, change of the flash voltage changes the conduction phase angle of the Triac 2. Specifically, a load of the motor 7 increases and the motor speed decreases, for example. At that time, the flash voltage increases to quicken the approach of the capacitor voltage to the breakover voltage of the Diac 3 and to advance the conducting phase angle of the Triac 2. As a result, the current flowing into the motor 7 increases to increase the rotational speed of the motor. Conversely, when the load of the motor 7 is reduced and the rotational speed of the motor increases, the flash voltage decreases and the capacitor voltage reaches the breakover voltage of the Diac 3 late. Accordingly, the conducting phase angle of the Triac 2 is retarded and the motor drive current decreases so that the rotational speed of the motor 7 decreases. In this way, the flash voltage operates so as to restrict a change of the motor speed due to the motor load. As described above, a simple circuit arrangment can directly control the AC commutator motor. The motor speed control circuit arrangement according to the invention saves manufacturing cost and improves the reliability because of a small number of circuit components. The feedback amount and the like may be adjusted by properly combining the resistance of the resistor 9 and the capacitance of the capacitor 4.

Figure 3:
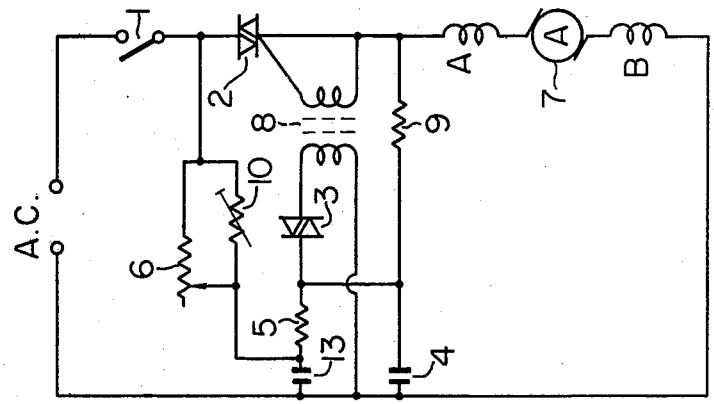
FIG. 3 shows an embodiment of the speed control circuit arrangement according to the invention.

FIG. 3 shows an example when the basic circuit shown in FIG. 2 is applied to an electric sewing machine. In the example, a capacitor 13 is additionally used to stabilize the motor operation at low speed and to reduce a hysteresis phenomenon of the overall circuit including the motor at start time.

Figure 5A:
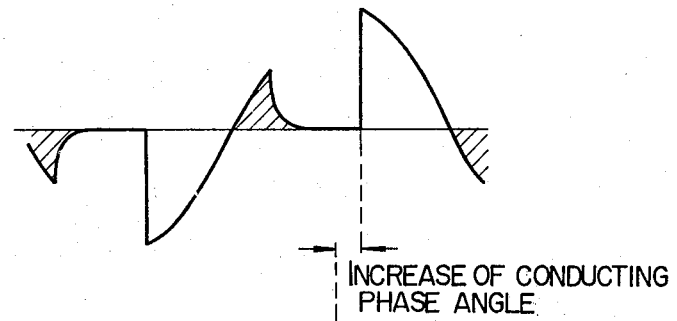
Figure 5B:
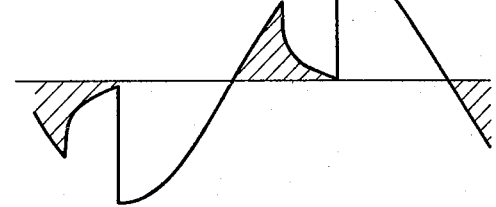

FIGS. 5A and 5B show voltage waveforms appearing between the terminals A and B of the circuit shown in FIG. 2. As seen from the waveforms, the conducting phase angle at a light load is larger than that at a heavy load because of the above-mentioned feedback action.

We claim:

1. A speed control circuit arrangement for an AC commutator motor, comprising:

an AC main control element having a control electrode, a first and a second main electrode, and connected at said first main electrode to one end of an external AC power source through a power switch and connected at said second main electrode to the other end of said external AC power source through an AC commutator motor, for controlling a drive current flowing into said motor;

a pulse transformer having a primary and a secondary winding, and connected at said secondary winding between said control electrode and said second main electrode, for supplying a trigger signal to said control electrode;

a variable resistor for adjusting a rotational speed of said motor;

a first capacitor connected between said first main electrode and the other end of said AC power source with said variable resistor intervening between said first capacitor and said first main electrode;

a pulse generating element connected across said first capacitor with said primary winding intervening therebetween; and a first resistor connected at one end to said second main electrode and at the other end to the other end of said AC power source through said first capacitor.

2. A speed control circuit arrangement for an AC commutator motor according to claim 1, further comprising a second resistor and a second capacitor, said second resistor and said second capacitor being connected in series to each other and then connected across said first capacitor, the one end of said variable resistor being connected a junction point of said second resistor and said second capacitor.

* * * * *